United States Patent [19]

Deary

[11] Patent Number: 5,406,418
[45] Date of Patent: Apr. 11, 1995

[54] MECHANICAL COUPLER FOR EYEPIECES

[75] Inventor: Randall J. Deary, Dunster

[73] Assignee: Precision Optics Corporation, Worcester City, Mass.

[21] Appl. No.: 92,140

[22] Filed: Jul. 15, 1993

[51] Int. Cl.⁶ .................................................. G02B 7/02
[52] U.S. Cl. ........................... 359/827; 359/894; 403/372; 411/500
[58] Field of Search ...................... 248/224.3, 222.3; 359/894, 827, 828; 403/360, 372; 411/500, 546, 539

[56] References Cited

U.S. PATENT DOCUMENTS

| | | | |
|---|---|---|---|
| 3,454,323 | 7/1969 | Dierks et al. | 359/827 |
| 4,066,330 | 1/1978 | Jones | 285/308 |
| 4,305,386 | 12/1981 | Tawara | 359/827 |
| 4,318,395 | 3/1982 | Tawara | 359/827 |
| 4,630,903 | 12/1986 | Jones | 359/894 |
| 4,740,058 | 4/1988 | Hori et al. | 359/827 |
| 4,784,118 | 11/1988 | Fantone et al. | 128/6 |

*Primary Examiner*—Loha Ben
*Assistant Examiner*—Thomas Robbins
*Attorney, Agent, or Firm*—Pearson & Pearson

[57] ABSTRACT

A mechanical coupler for connection to the eyepiece of an optical device. The coupler includes a body with an axially extending cylindrical wall that forms a socket with a spanning portion of the body. The cylindrical wall and body center and axially align the coupler and the eyepiece. A C-shaped clamping member has a central portion that is affixed to the wall and essentially tangentially extending free end portions that produce a side opening structure. When an eyepiece is inserted from the side, it wedges the free ends of the clamping member axially thereby producing internal restoring forces in the clamping member. When the eyepiece is seated in the socket, the free ends return toward a relaxed position and produce a clamping force that affixes the coupler axially to the eyepiece while permitting relative rotation between them.

20 Claims, 3 Drawing Sheets

MECHANICAL COUPLER FOR EYEPIECES

BACKGROUND OF THE INVENTION

1. Field of the Invention

This invention generally relates to accessories for joining optical devices and more particularly to adapters or couplers for interfacing an optical device to an eyepiece.

2. Description of Related Art

Eyepieces are associated with a number of optical devices including, as examples, endoscopes and borescopes. The term "endoscope" generally denotes a class of optical devices used for examining the internal cavities of the human body. The term "borescope" generally denotes a class of analogous devices for examining internal cavities in machinery or other nonhuman areas. Endoscopes and borescopes, have the same basic structure. Each contains an objective lens for gathering an image, one or more intermediate relay lenses or fiber optics for relaying the image through an elongated tube and eyepiece optics for allowing an individual to view the image directly.

The eyepiece optics in endoscopes and borescopes generally have a similar basic construction. Typically eyepiece optics include an eyepiece housing with a central cavity for any optical elements required by the eyepiece. Externally the eyepiece housing has a neck portion for attachment to an elongated tube from the endoscope or borescope. A frusto-conical or other conoidally-shaped housing section then flares from its distal end to a proximal end and terminates at a cylindrical peripheral flange portion. During direct viewing, an individual places his or her eye at this peripheral flange portion, that may or may not contain a viewing window.

Eyepieces differ by having diverse diameters and by having specially shaped conoidal or flared housing surfaces. These differences may result from requirements of the optical elements contained in the eyepiece or merely from an aesthetic design consideration. Even frusto-conical or flared housing sections of different eyepiece housings may vary for a given diameter eyepiece among eyepieces supplied by different manufacturers.

In many applications it is highly desirable to connect another device to the eyepiece. These devices may include photographic or television cameras or beam splitters for permitting two or more individuals to view an image simultaneously or to allow one individual to view the image directly while a television camera records the image simultaneously. Sometimes an individual has a preference for an eyepiece of a particular size the differs from the size of the eyepiece associated with the endoscope, borescope or the like. In both situations it is desirable to have an adapter that will attach the eyepiece of the desired size or a coupler that will attach a diverse optical device to an eyepiece associated with the endoscope or borescope. In the following discussion the term "coupler" is meant to include any such coupling devices or adapters.

Several couplers have been proposed for mechanically coupling an optical device to an eyepiece including those disclosed in the following U.S. Pat. Nos.
4,066,330 (1978) Jones
4,305,386 (1981) Tawara
4,318,395 (1982) Tawara
4,740,058 (1988) Hori The Jones patent discloses an endoscope eyepiece with an opto-mechanical coupler. A spring-biased cam ring mounted on the coupler rotates to retract retaining studs and integral heads radially outward. When the studs are retracted the eyepiece can pass between the heads for connection to or separation from the eyepiece. When the cam ring is released, a spring biases it to a stable position and thereby moves the studs radially inward until the heads engage the flared surface of the eyepiece housing. This action clamps the eyepiece to and centers the eyepiece on the coupler.

The Tawara-386 patent discloses an endoscope accessory mounting device, or coupler, with a spring-biased cam ring that controls the position of axially aligned, radially extending plate cams. When the cam ring is rotated, the eyepiece can freely pass into or separate from an eyepiece receiving socket in the accessory mounting device. When the eyepiece is located in the socket and the cam ring is released, springs displace the cam ring to its stable position and the cam plates rotate into engagement with the flared surface of the eyepiece thereby to clamp and center the accessory mounting device with respect to the eyepiece.

The Tawara-395 patent also discloses an endoscope coupler with spring-biased axially aligned cam plates that are biased against a radially acting spring biased plunger. In this coupler the eyepiece snaps into the coupler by driving the cam plates away from a central axis and compressing the springs on the cam plates. When the eyepiece seats in a socket, the springs drive the cam plates against the flared surface of the eyepiece to clamp and center the coupler with respect to the eyepiece. An individual compresses the radially acting, diametrically opposed plungers to move the cam plates to an open position when it is desired to separate the coupler from the eyepiece.

The Hori patent discloses an optical mechanical coupler with a C-shaped clamping member that is axially displaced from a clamping surface and operated by a locking ring or clamp member. When the clamp member rotates to one extreme position it axially displaces the C-shaped clamping member from the clamping surface. An eyepiece can then be inserted from the side. A reverse rotation of the clamp member displaces the C-shaped clamping member into the eyepiece thereby to clamp and center the coupler with respect to the eyepiece.

Over the years the use of these and other mechanical couplers for eyepieces have led to the establishment of a number of desirable coupler criteria. Specifically, the attachment and separation processes must be simple and be capable of being performed with one hand. It should be possible to rotate the coupler with respect to the eyepiece. The coupler must be easy to clean and, in the case of endoscopes, be easy during use to sterilize. It must be inexpensive to produce, and reliable in use. Further, it should be possible to attach a single coupler to eyepieces of a given nominal diameter having diverse cross-sections or forms through the flared housing portions.

Prior art couplers have exhibited some of these criteria, but not all of them. For example, The Tawara-395 patent coupler enables one-handed operation. The Jones and Tawara patents permit rotation between the eyepiece and the coupler. However, each of the above-described structures requires the assembly of a large number of components in the form of cam plate studs, Springs, rotatable control members, plungers and other elements. These structures are complicated, increase the manufacturing complexity and are subject to failure when debris accumulates in the operative mechanism during normal use, particularly in medical applications. Such couplers can not readily be repaired on site. A customer must maintain an inventory of such couplers or must be capable of operating whenever one of these couplers is at the factory for repair. With particular respect to endoscopes, the sterilization process is complicated because the mechanisms can trap solution making it difficult to assure that all the sterilizing solution has been evaporated or removed. Thus none of these couplers exhibit all the desirable criteria. Moreover, none of these couplers incorporate a simple, reliable structure.

SUMMARY

It is an object of this invention to provide a simple, reliable coupler for an eyepiece that contains no moving parts.

Another object of this invention is to provide a simple, reliable coupler for an eyepiece that is adapted for one-handed, quick attachment and release operations.

Still another object of this invention is to provide a simple, reliable coupler for an eyepiece that is adapted for simplifying cleaning and sterilizing operations.

Yet another object of this invention is to provide a simple, reliable coupler for an eyepiece that centers and aligns the eyepiece and the coupler and that accepts a wide range of eyepiece configurations.

Still yet another object of this invention is to provide a simple, reliable coupler for an eyepiece that centers and aligns the coupler and the eyepiece and that permits relative rotation between the eyepiece and the coupler.

Yet still another object of this invention is to provide a simple, reliable coupler for an eyepiece that centers and aligns the coupler and the eyepiece, that permits relative rotation between the eyepiece and the coupler, and that allows the angular position between the eyepiece and the coupler to be fixed.

A mechanical coupler constructed in accordance with this invention enables an image transmitted along an optical axis from an eyepiece associated with a first device to be received by a second device. The mechanical coupler includes a body with a first end portion that attaches to the eyepiece and a second axially-spaced portion that attaches to the second device. The body includes, at the first end portion, a cylindrical wall that centers the eyepiece on a coupler axis and an annular surface that abuts a cylindrical eyepiece flange portion of the eyepiece for aligning the coupler and optical axes. An integral axially-resilient clamp member attached to the cylindrical wall and the body form a side-opening receptacle for receiving the eyepiece. Free end portions of the clamp member deflect axially as the eyepiece is inserted into the receptacle. When the eyepiece seats in the receptacle, a restoring force, produced in the clamp when the free ends deflect, allows the free ends to engage the flared housing and clamp the cylindrical flange against the coupler body.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

FIGS. 1 through 5 depict one embodiment of a coupler in the form of an optical eyepiece adapter 10 that incorporates this invention and provides a simple structure for adapting an eyepiece having first characteristics, such as diameter and form, to an eyepiece having different characteristics. As shown particularly in FIGS. 1 through 3, the optical eyepiece adapter 10 includes a body 11 composed of machinable, thermally stable, lightweight material. For endoscopes the materials must additionally be colorfast and chemically inert. Such materials for the body 11 include aluminum, stainless steel and certain acetal compounds such as marketed under the name Delrin ®.

Figure 1:
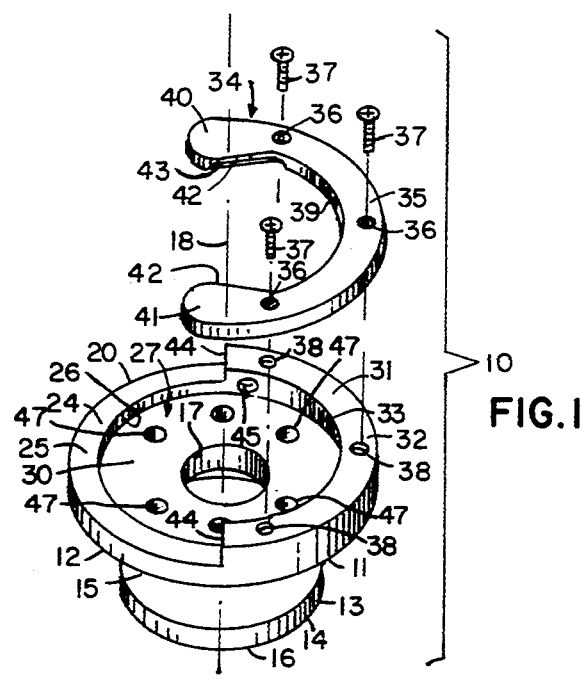
FIG. 1 is an exploded view of one embodiment of the mechanical coupler constructed in accordance with this invention for adapting an eyepiece of one size to another.
Figure 2:
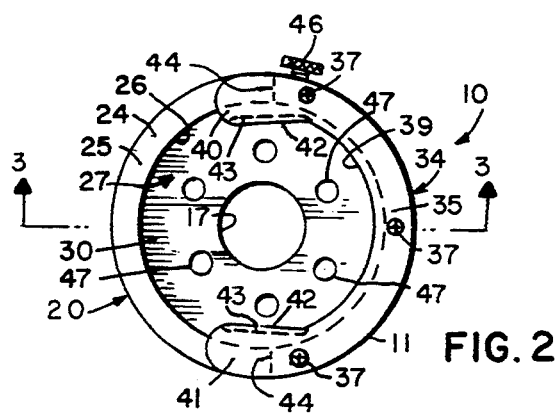
FIG. 2 is a top view of the mechanical coupler in FIG. 1 in an assembled form.
Figure 3:
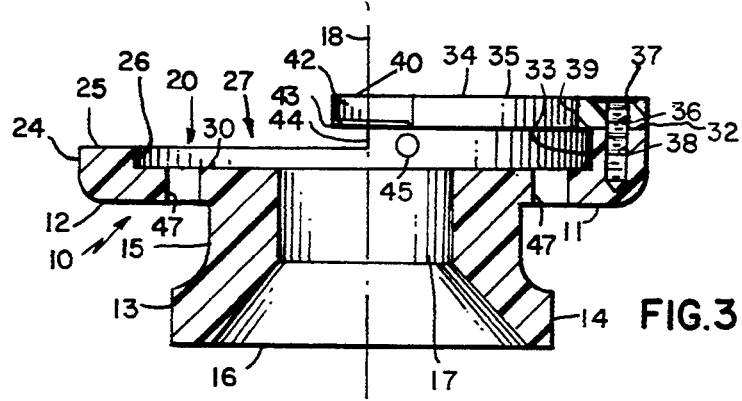
FIG. 3 is a sectional view of the mechanical coupler shown in FIG. 2 taken along lines 3—3 in FIG. 2.

One end section 12 of the body 11 includes an integral eyepiece 13 with a peripheral flange 14 and a flared conoidal housing 15 of a given form. The peripheral flange 14 constitutes a viewing end 16 that enables an individual to view an image transmitted through an aperture 17 that extends along a coupler axis 18. FIGS. 1 through 3 disclose a specific eyepiece known as a "B-mount" eyepiece.

Figure 4:
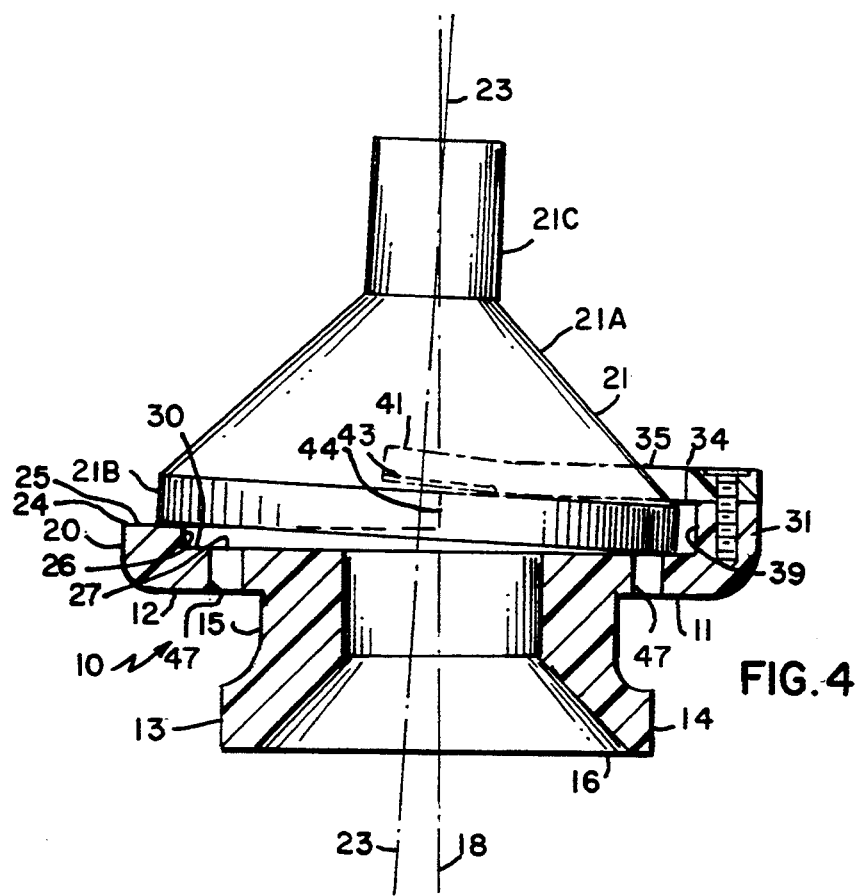
FIG. 4 is a side view from the right in FIG. 2 that depicts the mechanical coupler with a partially inserted eyepiece.
Figure 5:
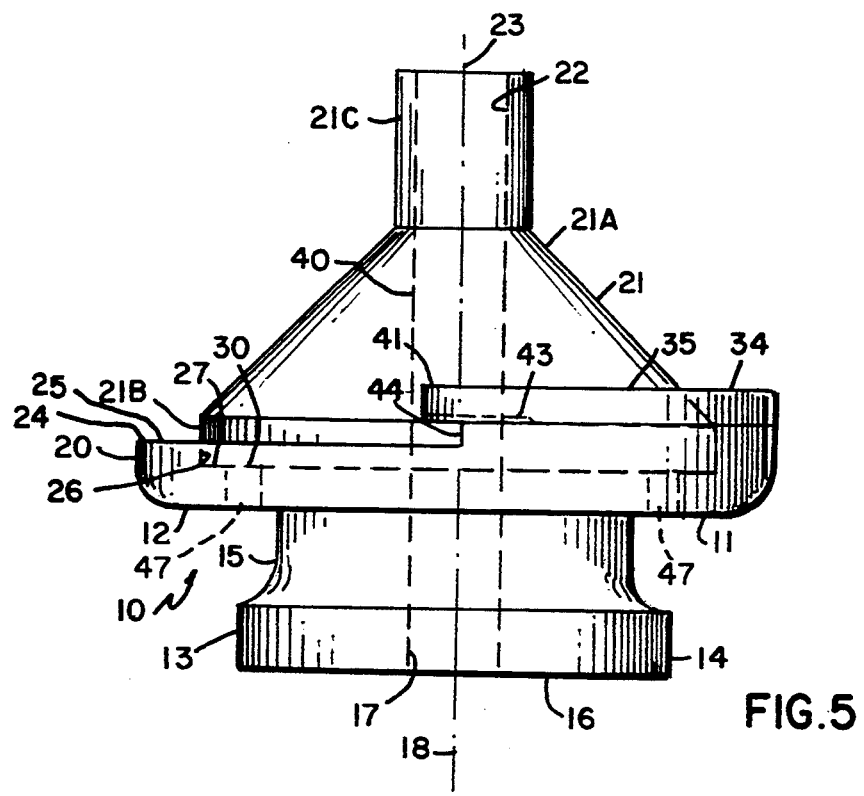
FIG. 5 is a side view taken from the right in FIG. 2 in which the eyepiece is seated in the mechanical coupler.

Another end section 20 of the body 11 is adapted for connecting to an eyepiece 21, as shown in FIGS. 4 and 5. This eyepiece 21 includes a housing portion 21A having a flared surface with its base contiguous a cylindrical flange portion 21B that extends axially from the flared housing portion. The cylindrical flange 21B has a predetermined axial dimension or depth. The other, or distal, end of the housing 21A terminates at a neck portion 21C. A central aperture 22 extends through the eyepiece 21 along an optical axis 23.

Referring again to FIGS. 1 and 2, the body 11, at the end section 20, has an axially extending wall 24 with a radial end surface 25 and an inner axially extending, cylindrical wall surface 26. The inner wall surface 26 conforms to the eyepiece central flange 21B as shown in FIGS. 4 and 5 for centering the eyepiece 21 on the coupler axis 18. The cylindrical wall 24 then forms a socket or receptacle 27 having as a base or abutting surface a radially extending planar annular wall 30. The wall surface 30 is centrally located with respect to the cylindrical wall 24 and abuts the cylindrical flange portion 21C to align the coupler axis 18 with the optical axis 23. In this particular embodiment the wall 30 comprises a radially extending planar surface. However, the wall 30 could have a conical form to provide edge contact, with respect to the cylindrical flange 21B, rather than a surface contact with the flange 21B as shown in the Figures.

The cylindrical wall 24 additionally comprises an arcuate, axially extending step 31 with a top surface 32 and an inner surface 33. In this particular embodiment the step has a semicircular configuration and extends approximately 180° around the top 25 of the cylindrical wall 24. As apparent from the Figures, the depth of the cylindrical wall 24 and the step 31 corresponds to the height of the flange 21B.

The step 31 supports an integral, axially resilient C-shaped clamping member 34 that captures the eyepiece 21 in the socket 27 as shown particularly in FIGS. 4 and 5. The clamping member 34 has a central arcuate section 35 with spaced apertures 36. Machine screws 37, or other fastening devices, engage threaded apertures 38 in the step 31 thereby to clamp the central portion 35 against the seat 31.

In a preferred form of this structure, the radial dimension of the central portion 35 exceeds the radial dimension of the step 31. When the clamping member 34 is properly positioned, an inner edge extends radially inward from an inner surface 33 of the step 31 thereby to form an overhanging lip 39. The lip 39 engages the conoidal housing 21A of the eyepiece 21 as disclosed more fully later.

The clamping member 35 additionally contains two free ends 40 and 41 that extend essentially tangentially from the arcuate central portion 35 to complete the "C" shape. Each of the free ends 40 and 41 has an inwardly facing edge 42 with a chamfer 43 along the bottom edge thereof. The inner edge 42 extends radially inward to overlap the surface 30; it is spaced axially from the surface 30.

The clamping member 34 is composed of a material that has the same characteristics as the body 10. It also must be of a material that enables the free ends 40 and 41 to deflect relative to the central portion 35 and that generates a restoring force during such a deflection. Acetal compounds, such as Delrin® are particularly adapted for use as a clamping member.

The clamping member 34, as shown most clearly in FIGS. 1 and 2, forms a side-opening structure and the free ends 40 and 41 lie in the plane of the clamping member 34 when the socket 27 is empty. The side opening allows an individual to slide an eyepiece 21 into the socket 27 from the side, from the left in FIGS. 1 through 5. As shown in FIG. 4, when this occurs, the flared portion 21A, that is proximate the flange 21B, engages and axially deflects the free ends 40 and 41. Specifically, that proximate portion of the housing 21A engages the chamfer 43 on the free ends 40 and 41. As the flange 21B must ride over the top surface 25 of the cylindrical wall 24 during this motion, the housing 21A wedges the free ends 40 and 41 and deflects them upward about an axis through the outer fastenings 37.

During this deflection the material in clamping member 34 develops its internal restoring force. When the eyepiece 21 centers in the socket 27, the flange 21B drops to mate against the surface 30 and the restoring force returns the free ends 40 and 41 toward a normal position. However, interference between the chamfered edges 43 and the housing 21B prevent a complete return, so a residual restoring force continues to act on the free ends 40 and 41. This residual force produces an axially directed clamping force along the edges at proximate, diametrically opposed positions on the housing 21. The combination of this clamping action and the interference between the lip 39 and the housing 21A capture the eyepiece flange 21B in the socket 27. The inner cylindrical wall 26 prevents any relative lateral motion between the eyepiece 21 and the adapter 10. However the adapter 10 is free to rotate about the coupler axis 18 and optical axis 23 with respect to the eyepiece 21.

Referring to FIGS. 1 through 3, the adapter 10 may contain a mechanism for locking the adapter 10 to the eyepiece 21. In this particular embodiment a radially extending threaded aperture 45 passes through an end portion of the cylindrical wall 24 and step 31 and carries a locking screw 46 or like structure. When the locking screw 46 advances radially toward the axis 18, it engages the flange 21B and prevents rotation between the eyepiece adapter 10 and the eyepiece 21.

In use, the eyepiece adapter 10 shown in FIGS. 1 through 5 can be clamped to an eyepiece, such as the eyepiece 21 of an endoscope, borescope or the likely, merely by holding the eyepiece in one hand and snapping the eyepiece adapter 10 onto the eyepiece 21 with the other hand. Once the eyepiece adapter 10 is mounted on the eyepiece 21, it is a simple matter to lock the eyepiece adapter in place merely by turning the locking screw 46, which can be done independently with one hand. Finally, a separation procedure, that is the reverse of the attachment procedure, is readily accomplished with a single hand. Any sideways motion that might be induced during such an attachment or separation is limited. Specifically, forces tending to pivot the distal end would be applied to the proximal end, and the hand that holds the eyepiece would act as a pivot. The length of the lever arm between the point of force application and the pivot will be very short with respect lever arm between the pivot and the distal end of the endoscope or borescope, so only a small fraction of any force applied transversely at the proximal end would transfer to the distal end.

From the foregoing, it will be evident that the eyepiece adapter 10 shown in FIGS. 1 through 5 provides a simple, reliable adapter 10 with no moving parts. There are no small cavities in which sterilization materials or other debris can collect. The adapter 10 centers and aligns its axis 18 with the optical axis 23 simply and typically with a one-handed operation. Moreover, the structure of the clamping member 34, the step 31 and the annular wall 34 allow a single adapter to be used with a variety of eyepieces of a given diameter irrespective of the configuration of their housing.

Figure 6:
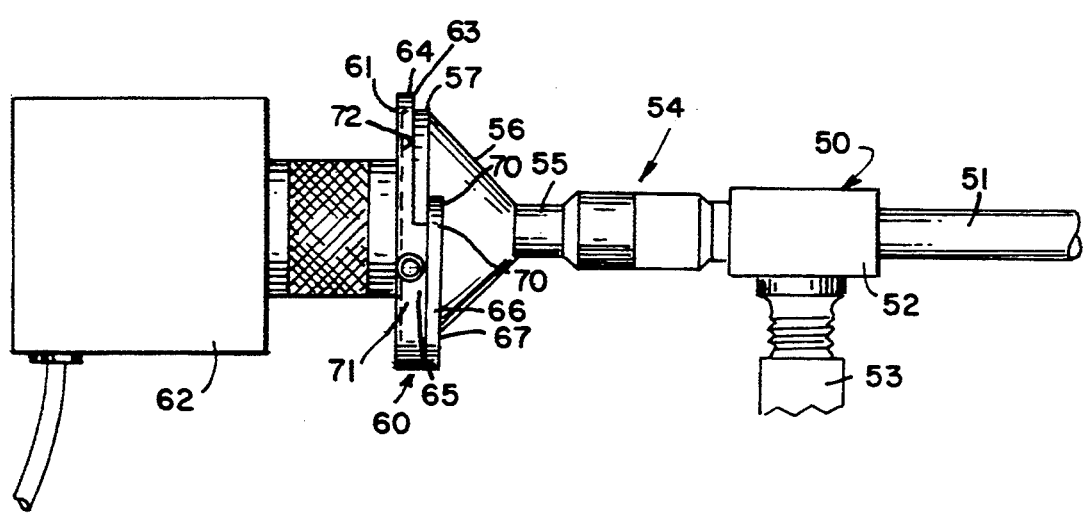
FIG. 6 is a side view depicting another embodiment of a mechanical coupler constructed in accordance with this invention for interconnecting an eyepiece from an endoscope or borescope and an optical device.

FIG. 6 discloses a mechanical coupler that is constructed in accordance with this invention and that is an integral portion of an optical device. More specifically, FIG. 6 discloses an endoscope 50 with an elongated tubular sheath 51 that extends from the proximal end shown in FIG. 6 to a distal end (not shown). Typically an endoscope 50 includes a lens housing 52 at the proximal end of the sheath 51 and a light source 53 coupled to the lens housing 52. In this particular embodiment an eyepiece section 54, containing eyepiece optics, includes as axially displaced housing elements, an eyepiece neck section 55, a flared conoidally-shaped housing section 56 and a peripheral flange portion 57 that forms a direct viewing port for the endoscope 54.

A mechanical coupler 60 constructed in accordance with this invention and having the same general configuration as shown at the second end section 20 of FIGS.

1 through 5, includes an end section 61 attached to an optical device 62, for example, a television camera. The other end section 63 of the mechanical adapter 60 includes a cylindrical wall 64 with an axial step portion 65. A clamping plate 66 has a central portion 67 affixed to the axial step 65 and free ends 70 that extend essentially tangentially from the central portion 67 to form a C-shaped clamping member. The cylindrical wall 64 and axial step 65 form a socket 71 with a radially extending base 72 for receiving the eyepiece 54.

The procedures for attaching and separating the optical device 62 to and from the endoscope 50 are the same as described with respect to the adapter 10 shown in FIGS. 1 through 5. An individual grasps the endoscope 50 with one hand in the area of the eyepiece 54 and the lens housing 52 and the optical device 62 with the integral coupler 60 in the other hand. Then holding the endoscope 50 in a steady fashion, the adapter 60 is slid radially around the eyepiece flange 57. After the flange 57 seats in the socket 71, the optical device 62 can be rotated with respect to the endoscope 50 until an appropriate orientation in the viewed image is obtained. A locking means, such as the locking screw 46 in FIGS. 1 and 2, but not shown in FIG. 6, can maintain the appropriate orientation.

The coupler 60 in FIG. 6 exhibits all the desirable criteria. It is a simple integral structure with no moving parts. It is readily sterilized without any concerns over the accumulation of sterilizing solutions or debris. It is highly reliable and is designed for manufacture at less cost than prior art couplers used for the same purposes. It also is simple to use.

It will be apparent that a number of variations can be made to mechanical couplers of this invention, particularly the adapter 10 of FIGS. 1 through 5 and the coupler of FIG. 6 while attaining some or all of the advantages of this invention. For example, the step 31 in FIG. 1 extends for approximately 180°. It is possible for the extent of that step 31 to be reduced to less than that complete angle, particularly if no locking structure is included. Different fastening devices might be used to affix the clamps 34 and 66 to the axial steps 13 and 65 respectively. In FIG. 1 the eyepiece 13 is formed integrally with the adapter 10. In FIG. 6, the coupler 60 is formed integrally with the optical device 62. Alternatively the adapter 60 might comprise a threaded mounting structure allowing it to be connected to a variety of different optical devices. Different applications may permit other materials to be utilized, the materials described here being particularly appropriate for use in endoscope applications. Thus, while this invention has been disclosed in terms of certain embodiments, it is the intent of the appended claims to cover all such variations and modifications as come within the true spirit and scope of this invention.

What is claimed and desired to be secured by Letters Patent of the United States is:

1. A mechanical coupler for enabling an image transmitted along an optical axis from an eyepiece associated with a first device to be received by a second device wherein the eyepiece has an eyepiece housing including a flared conoidal housing portion having a base contiguous a cylindrical flange portion wherein the housing portion extends axially therefrom and a coaxial aperture extends through the eyepiece, said mechanical coupler comprising:
   (A) body means having a first end portion for attachment to the eyepiece and a second end portion spaced along a coupler axis for attachment to the second device, said body means including, at said first end portion:
      (i) an axially extending cylindrical wall means that conforms to the eyepiece cylindrical flange for centering the eyepiece on the coupler axis, and
      (ii) an annular means centrally located with respect to said cylindrical wall means for abutting the cylindrical flange portion thereby to align the coupler and optical axes, and
   (B) integral, axially resilient clamping means for capturing the eyepiece against said body means, said clamping means including:
      (i) a central portion for affixing said clamping means to a portion of said cylindrical wall means, and
      (ii) free end portions extending from opposite ends of said central portion thereby and spaced axially from said cylindrical wall means thereby to form a side-opening receptacle for receiving the eyepiece, said free end portions being deflected axially as the eyepiece is inserted into said receptacle and thereafter engaging the conoidal housing and holding the cylindrical flange axially against said abutting means while allowing said mechanical coupler and the eyepiece to undergo relative rotation about the optical axis.

2. A mechanical coupler as recited in claim 1 wherein the eyepiece cylindrical flange has a predetermined axial dimension and said clamping means central portion includes a lip portion extending radially inward from the inner surface of the cylindrical wall means and axially spaced from said annular means for engaging the conoidal housing.

3. A mechanical coupler as recited in claim 2 wherein said cylindrical wall includes an arcuate, axially extending step that defines an arc of less than 180°, wherein said depth of said cylindrical wall at said step approximates the predetermined axial flange dimension and wherein said central portion of said clamping means is affixed to said step.

4. A mechanical coupler as recited in claim 3 wherein said clamping means free ends having radially extending portions that extend radially inward from said cylindrical wall portion to overlap said abutting means and that are axially spaced therefrom for engaging the conoidal housing.

5. A mechanical coupler as recited in claim 4 wherein said central portion of said clamping means defines an arc of in the range up to 180°.

6. A mechanical coupler as recited in claim 4 wherein each of said free ends includes a surface that faces the conoidal housing, each of said surfaces being chamfered for facilitating the insertion of the eyepiece into said axial abutting means.

7. A mechanical coupler as recited in claim 4 wherein said clamping means is formed of a material that permits the deflection of the free ends to produce a restoring force whereby said free ends exert an axial clamping force on the conoidal housing when the cylindrical flange sets against said abutting means.

8. A mechanical coupler as recited in claim 7 wherein clamping means is composed of an acetal compound.

9. A mechanical coupler as recited in claim 4 wherein said annular means in said body means is constituted by a central cylindrical portion with a radially extending surface for receiving the cylindrical flange portion of the eyepiece.

10. A mechanical coupler as recited in claim 4 wherein additionally comprising locking means supported by said cylindrical wall means for preventing relative rotation between said mechanical coupler and the eyepiece.

11. An eyepiece adapter for interfacing to an optical device with a first eyepiece having an eyepiece housing with first characteristics disposed along an optical axis and including an axially extending conoidal housing portion having a base contiguous a cylindrical flange portion and a coaxial aperture extending therethrough, said eyepiece adapter comprising:

(A) a second eyepiece housing means having a housing portion and flange portion with characteristics that differ from the characteristic of the first eyepiece, (B) body means having a first end portion for attachment to the first eyepiece and a second end portion spaced along a coupler axis for supporting the second eyepiece, said body means including, at said first end portion:

(i) axially extending cylindrical wall means that conforms to the cylindrical flange of the first eyepiece for centering the first eyepiece on the coupler axis, and (ii) annular means centrally located with respect to said cylindrical wall means for abutting the cylindrical flange portion of the first eyepiece thereby to align the coupler and optical axes, (C) integral, axially resilient clamping means for capturing the first eyepiece against said body means, said clamping means including:

(i) a central portion for affixing said clamping means to a portion of said cylindrical wall means, and (ii) free end portions extending from opposite ends of said central portion and spaced axially from said cylindrical wall means thereto to form a side-opening receptacle for receiving the first eyepiece, said free end portions being deflected axially as the first eyepiece is inserted into said receptacle and thereafter engaging the conoidal housing of the first eyepiece and holding the cylindrical flange of the first eyepiece axially against said abutting means while allowing said adapter and the first eyepiece to undergo relative rotation about the optical axis.

12. An eyepiece adapter as recited in claim 11 wherein the cylindrical flange of the first eyepiece has a predetermined axial dimension and said clamping means central portion includes a lip portion extending radially inward from the inner surface of the cylindrical wall means and axially spaced from said annular means for engaging the conoidal housing of the first eyepiece.

13. An eyepiece adapter as recited in claim 12 wherein said cylindrical wall includes an arcuate, axially extending step that defines an arc of less than 180°, wherein said depth of said cylindrical wall at said step approximates the predetermined axial dimension of the first eyepiece flange and wherein said central portion of said clamping means is affixed to said step.

14. An eyepiece adapter as recited in claim 13 wherein said clamping means free ends having radically extending portions that extend inward from said cylindrical wall portion to overlap said abutting means and that are axially spaced therefrom for engaging the conoidal housing of the first eyepiece.

15. An eyepiece adapter as recited in claim 14 wherein said central portion of said clamping means defines an arc of to in the range up to 180°.

16. An eyepiece adapter as recited in claim 14 wherein each of said free ends includes a surface that faces the conoidal housing of the first eyepiece, each of said surfaces being chamfered for facilitating the insertion of the first eyepiece into said axial abutting means.

17. An eyepiece adapter as recited in claim 14 wherein said clamping means is formed of a material that permits the deflection of the free ends to produce a restoring force whereby said free ends exert an axial clamping force on the conoidal housing of the first eyepiece when the cylindrical flange thereof sets against said abutting means.

18. An eyepiece adapter as recited in claim 17 wherein clamping means is composed of an acetal compound.

19. An eyepiece adapter as recited in claim 14 wherein said annular means in said body means is constituted by a central cylindrical portion with a radially extending surface for receiving the cylindrical flange portion of the first eyepiece.

20. An eyepiece adapter as recited in claim 14 wherein additionally comprising locking means supported by said cylindrical wall means for preventing relative rotation between said mechanical coupler and the first eyepiece.

* * * * *

UNITED STATES PATENT AND TRADEMARK OFFICE
CERTIFICATE OF CORRECTION

PATENT NO. : 5,406,418
DATED : April 11, 1995
INVENTOR(S) : Randall J. Deary It is certified that error appears in the above-identified patent and that said Letters Patent is hereby corrected as shown below:

Title page, item [73] Assignee, change "Worcester City" to "Gardner"

Signed and Sealed this

Thirteenth Day of June, 1995

Attest:

BRUCE LEHMAN

Attesting Officer

Commissioner of Patents and Trademarks